United States Patent [19]

Shimizu

[11] Patent Number: 4,557,705

[45] Date of Patent: Dec. 10, 1985

[54] VARIABLE RATIO DRIVE

[75] Inventor: Yasuo Shimizu, Saitama, Japan

[73] Assignee: Honda Giken Kogyo Kabushiki Kaisha, Tokyo, Japan

[21] Appl. No.: 702,864

[22] Filed: Feb. 20, 1985

Related U.S. Application Data

[63] Continuation of Ser. No. 491,977, May 5, 1983, abandoned.

[30] Foreign Application Priority Data

May 27, 1982 [JP] Japan .................... 57-90382

[51] Int. Cl.⁴ ............................................ F16H 11/06
[52] U.S. Cl. ......................................... 474/13; 474/28
[58] Field of Search ..................... 474/11-13, 474/16, 28, 50, 70, 109; 74/864

[56] References Cited

U.S. PATENT DOCUMENTS

| | | |
|---|---|---|
| 2,731,849 | 1/1956 | Rockwood et al. |
| 3,659,470 | 5/1972 | Beaudoin ............... 474/13 |
| 4,228,691 | 10/1980 | Smirl ..................... 474/28 |

FOREIGN PATENT DOCUMENTS

| | | |
|---|---|---|
| 0005565 | 11/1979 | European Pat. Off. |
| 0011342 | 5/1980 | European Pat. Off. |
| 0027672 | 4/1981 | European Pat. Off. |
| 1119621 | 12/1961 | Fed. Rep. of Germany |
| 2808810 | 9/1978 | Fed. Rep. of Germany |
| 873451 | 7/1961 | United Kingdom |
| 1416633 | 9/1965 | United Kingdom |
| 2036204 | 6/1980 | United Kingdom |
| 2043807 | 10/1980 | United Kingdom |
| 1579523 | 11/1980 | United Kingdom |

Primary Examiner—Stephen J. Novosad
Assistant Examiner—Thuy M. Bui
Attorney, Agent, or Firm—Lyon & Lyon

[57] ABSTRACT

A variable diameter sheave including a hydraulic chamber for controlling the spacing of the side plates of the sheave. A control valve is employed to control the hydraulic cylinder and is itself responsive to an input mechanism and a feedback mechanism. The input mechanism employed is a centrifugal weight responsive to the speed of rotation of the sheave. Feedback is provided by a rigid link sensing the effective diameter of the sheave. Two valve elements are employed in the control valve which are responsive to the input mechanism and the feedback mechanism to effect proper positioning of the sheave as a function of input speed.

16 Claims, 3 Drawing Figures

VARIABLE RATIO DRIVE

This application is a continuation of application Ser. No. 491,977, filed May 5, 1983, now abandoned.

BACKGROUND OF THE INVENTION

The field of the present invention is automatic variable ratio pulleys and particularly those used for automotive accessories or the like.

Conventionally, powered accessories, such as alternators, compressors for air conditioners, and pumps for power steering used on variable speed engines, have been driven from one end of the crankshaft of such an engine by means of pulleys, belts and the like. As a result, the accessories are rotated at velocities which are proportional, depending on the pulley reduction, to the rotating speed of the engine. In the case of automotive engines and the like, a great variation in speed is experienced by the engine and in turn the powered equipment.

It is necessary with such accessories to be driven at a minimum speed when the engine is running slowly. However, when the engine is sped up, the accessories are often driven much faster than necessary. The excessive speeds required of such accessories under such conditions are disadvantageous as they require additional power from the engine, they experience less reliability under such conditions, they generate additional unnecessary noise and they must be made stronger and more adaptable to the speed ranges.

Devices have been developed for driving accessories which include multiple ratios. Such devices include fixed multiratio transmissions employing automatic clutching mechanisms. Such devices provide a better compromise between engine speeds and accessory speeds. However, such devices can result in abrupt speed changes transmitted to the accessories when the ratios are changed. Under such conditons, the added forces of acceleration and deceleration contributed by the transmission must be considered in the design of drive belts and accessory components. Additionally, the high force loading on the clutch mechanisms in such devices can often result in high clutch wear and early failure.

Such transmissions for auxiliary equipment drives have also included variable diameter sheaves which are typically responsive to the action of centrifugal weights, hydraulic pressure or the like. Such devices can reduce the shock loading of fixed ratio devices. However, they do not normally include a means for providing feedback to the control device as to the effective sheave diameter. Consequently, the sheave diameter is not easily controlled, particularly when stepless ratio operation is to be employed rather than fixed set ratios. Additionally, many devices require complicated mechanisms for achieving the appropriate speed to sheave diameter response or simply provide stepped stations, effecting stepped fixed ratio operation.

SUMMARY OF THE INVENTION

The present invention is directed to a variable ratio drive having particular utility in the driving of accessories on variable speed internal combustion engines. The drive employs a variable diameter sheave driven hydraulically with an input responsive to the speed of the engine and feedback control of the input responsive to the actual sheave diameter. Accurate stepless ratio change may thereby be achieved. As a result, the mechanical shock of more fixed ratio devices is eliminated while predetermined accessory speeds are obtained through the variable ratio input without clutches, gear trains and the like. The stepless ratio change can be made automatically through the use of a speed sensing mechanism as the system input.

Accordingly, it is an object of the present invention to provide a stepless ratio change system providing a variable ratio drive particuarly adapted for use as a system for driving accessories on a variable speed engine. Other and further objects and advantages will appear hereinafter.

DETAILED DESCRIPTION OF THE PREFERRED EMBODIMENT

Figure 1:
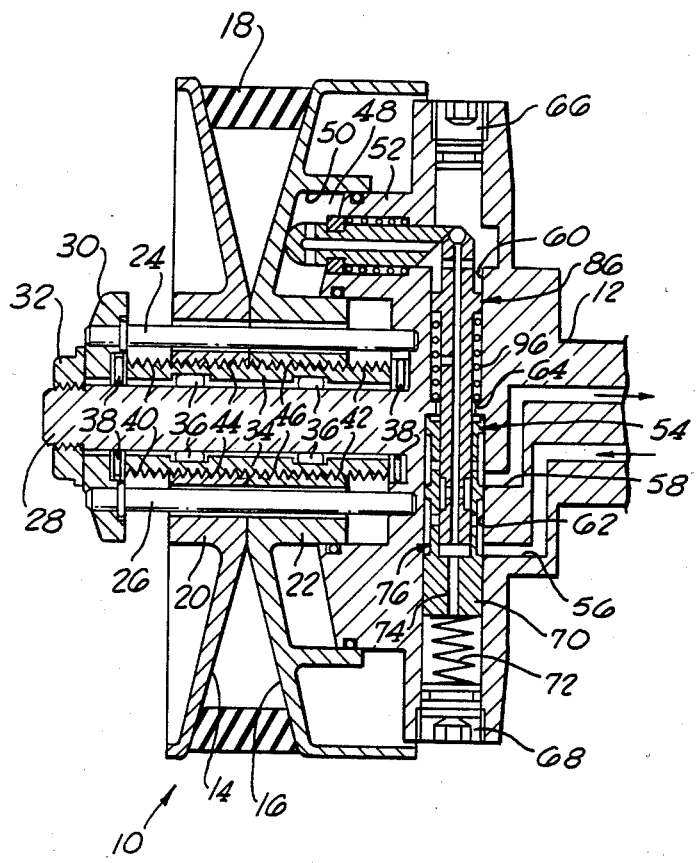
FIG. 1 is a cross-sectional elevation of a device of the present invention with the sheave at a maximum diameter.
Figure 2:
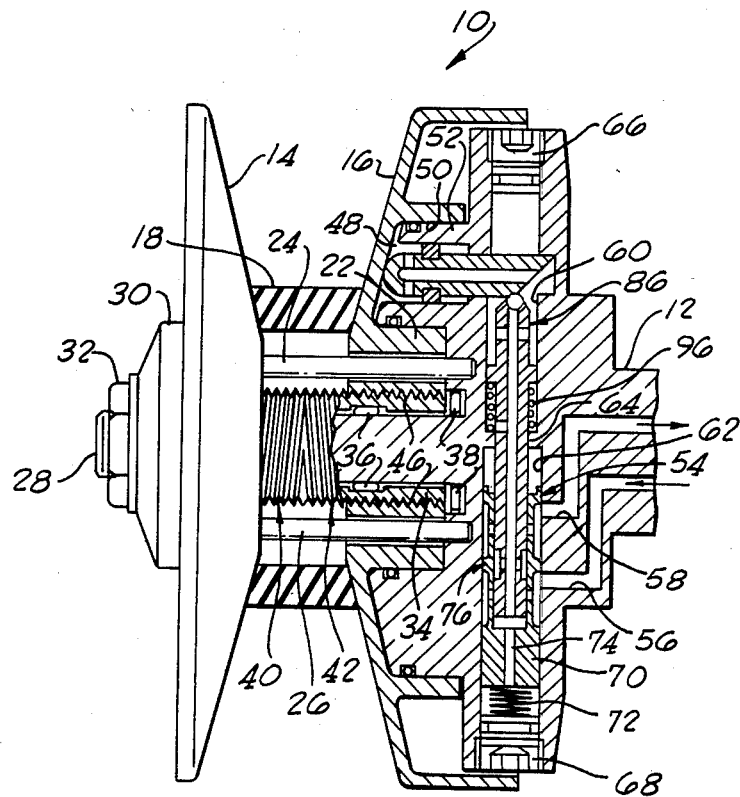
FIG. 2 is a cross-sectional elevation of the device of FIG. 1 with the sheave at a minimum diameter.

Turning in detail to the drawings, FIG. 1 illustrates a variable speed drive which may be driven by a variable speed engine, the entire device thereby rotating with, for example, the crankshaft. A pulley or sheave, generally designated 10 is caused to rotate with a driving member 12. The driving member 12 is mounted to and caused to rotate with the input which is typically an engine crankshaft. The sheave 10 is a variable diameter sheave controlled by a hydraulic system which is generally contained within the driving member 12. By varying the width of the sheave, a variable effective diameter may be achieved as can best be illustrated by a comparison of FIGS. 1 and 2.

Looking first to the variable diameter sheave, a first cheek or side plate 14 cooperates with a second side plate 16 to define a V-groove therebetween. As noted above, the V-groove may be varied in its width dimension. A belt 18 is illustrated in place within the V-groove and is shown to assume a larger diameter in FIG. 1 and a smaller diameter in FIG. 2, the extremes of the sheave positions. Each of the side plates 14 and 16 includes a hub. The hubs 20 and 22 are rigidly fixed to the side plates 14 and 16, respectively, to rotate therewith.

Extending parallel to the axis of the hubs 20 and 22 are guidebars 24 and 26. The guidebars 24 and 26 are shown to be two in number. However, any number of guidebars may be employed where appropriate. The guidebars extend through passageways formed for this purpose in the hubs 20 and 22. By extending in this manner, the guidebars 24 and 26 can apply force to the hubs 20 and 22 for rotation thereof while allowing axial movement of each of the hubs for sheave diameter variation.

To further support and drive the sheave 10, the driving member 12 extends as a driving shaft 28 outwardly to receive the hubs 20 and 22. The driving shaft 28 includes a stop 30 held on by a nut 32. The stop 30 and nut 32 are caused to rotate with the driving shaft 28. To insure rotation of the sheave 10 with the driving shaft 28, the guidebars 24 and 26 extend at first ends thereof into the driving member 12 and at second ends thereof into the stop 30.

To provide a fixed center plane for the V-groove of the sheave 10, a threaded sleeve 34 is positioned about the driving shaft 28 and within the hubs 20 and 22. The threaded sleeve 34 is rotatably mounted on the driving shaft 28 by means of roller bearings 36. The threaded sleeve 34 is also constrained axially to remain between the driving member 12 and the stop 30 by thrust roller bearings 38 at either end of the sleeve.

To control the axial location of the side plates 14 and 16, the threaded sleeve 34 includes left-handed external threads 40 on one half of the threaded sleeve 34 and righthanded external threads 42 on the other half of the sleeve 34. Corresponding left-handed and right-handed internal threads 44 and 46 are arranged on the inside surfaces of the hubs 20 and 22, respectively. In this way, the side plates 14 and 16 will move axially relative to the driving shaft 28 in equal and opposite directions when changing effective sheave diameter. Thus, the center line of the V-groove is maintained fixed.

A hydraulic drive which is coupled with the variable diameter sheave 10 to vary the diameter thereof is positioned on one side of the sheave 10 in cooperation with the side plate 16. Because of the threaded cooperation between the hubs 20 and 22 and the threaded sleeve 34, it is only necessary to drive one of the two side plates 14 and 16. The hydraulic drive includes a hydraulic chamber 48 which is annular in form. A first wall 50 is formed on the back side of the side plate 16 to define a circular channel having a pressure receiving surface arranged for providing axial forces to the sheave assembly.

Cooperating with the hydraulic chamber 48 is a fixed piston 52. The fixed piston 52 is also of annular arrangement to fit within the annular hydraulic chamber 48. Appropriate seals are provided on all joint surfaces to contain the anticipated hydraulic pressure. The hydraulic drive, when pressure is applied thereto, causes the side plate 16 to move away from the driving member 12 with its integral fixed piston 52. This results in the effective diameter of the sheave increasing. When pressure is released from the hydraulic chamber 48, the tension of the pulley belt 18 will result in expansion of the V-groove to reduce the effective diameter of the sheave 10.

A hydraulic control valve is employed in the variable ratio drive system in communication with the hydraulic drive to control the effective sheave diameter. The hydraulic control valve, generally designated 54, is contained within the body of the driving member 12 to effectively control the diameter of the sheave 10. This is accomplished by means of an input means for sensing the speed of the sheave and a feedback means which senses the effective diameter of the sheave. The control valve 54 provides a means for controlling hydraulic pressure from a hydraulic pressure inlet passage 56 and a hydraulic outlet passage 58. The hydraulic control valve 54 is generally contained within two axially aligned cylindrical bores 60 and 62 which extend diametrically across the driving member 12. The cylindrical bores 60 and 62 are divided by an annular flange 64 and are closed at their outer ends by plugs 66 and 68, respectively.

The input means which acts to sense the sheave speed may be any of a number of sensing elements directly associated with the drive or connected electronically therewith from another part of the engine. In the preferred embodiment, a direct mechanism is employed including a centrifugal weight 70 positioned on one side of the axis of rotation in the cylinder 62. Resisting the centrifugal weight 70 is a coil spring 72 held in place by the closure plug 68. As the cylindrical bores 60 and 62 are filled with hydraulic fluid, a relief passageway 74 extends axially through the centrifugal weight 70 to allow working fluid to circulate as the weight moves.

Integrally formed with the centrifugal weight 70 so as to be positionally responsive thereto is a first valve element 76. The valve element 76 generally forms a cylindrical tube which is of appropriate length in combination with the centrifugal weight 70 so as to extend to the annular flange 64 under the influence of the spring 72 when the device is at rest. The valve element 76 includes annular passages 78 and 80. The annular passages 78 and 80 are each of sufficient axial length so as to be in continuous communication with the inlet passage 56 and the outlet passage 58 through the entire stroke of the valve element 76. This can best be illustrated by a comparison of FIGS. 1 and 2 which illustrate the valve element 76 in its extreme positions. Extending through the wall of the tubular structure of the valve element 76 are hydraulic pressure inlet ports 82 extending inwardly from the annular passage 78. Because of the length of the annular passage 78, the hydraulic pressure inlet ports 82 are continuously in communication with the hydraulic inlet passage 56. As each port 82 is positioned at the same axial location on the element 76, they will provide a common location for inlet pressure which will vary with the movement of the valve element 76. Similarly, hydraulic pressure outlet ports 84 extend inwardly from the annular passage 80. The ports 84 are, therefore, in continuous communication with the pressure outlet passage 58.

A second valve element 86 is also formed of a cylindrical tube which is concentrically and slidably mounted within the first valve element 76. A central bore 88 extends through the first valve element 76 so as to receive the second valve element 86. A passage 90 extends through the second valve element 86 and includes outlets 92 such that the passage 90 will be in communication with the hydraulic drive as further described below. The second valve element 86 also includes a radial flange 94 extending outwardly from the body of the element 86 to form a shoulder for cooperating with a coil spring 96. The coil spring 96 extends from the radial flange 94 to the annular flange 64 so as to bias the second valve element 86 in a direction away from the centrifugal weight 70. The second valve element 86 also includes a port 98 and a gap about its periphery with the annular flange 64 for fluid circulation to allow movement of the valve elements.

Figure 3:
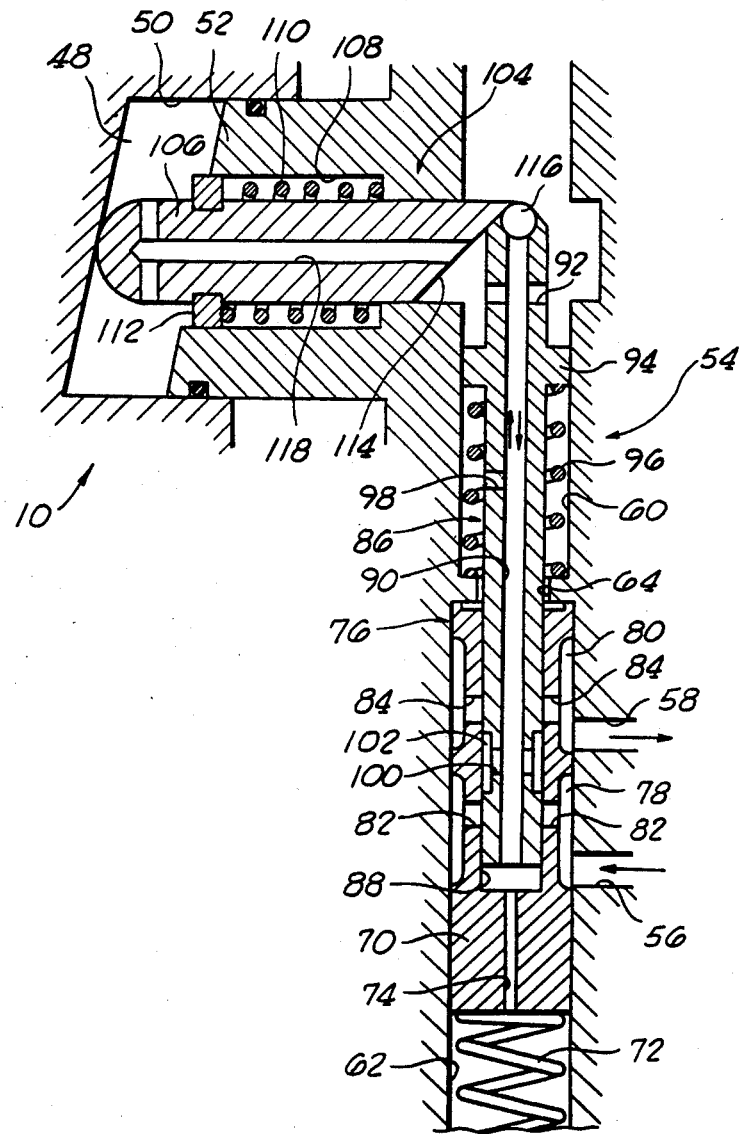
FIG. 3 is a detailed cross-sectional elevation of an embodiment of the control valve of the present invention.

The second valve element 86 defines, by means of its tubular wall, a valve port closure member. The second valve element 86 acts to close the hydraulic pressure inlet ports 82 and the hydraulic pressure outlet ports 84 from communication with the passage 90 extending through the second valve element 86. With the second valve element 86 positioned relative to the first valve element 76 as illustrated in FIG. 3, neither inlet pressure nor outlet pressure relief is available to the passage 90 and in turn the hydraulic drive. To provide selective communication between the source and exhaust of pressure and the passage 90, a control port 100 extends, in cooperation with an annular passage 102, through the wall of the tube of the second valve element 86. The annular passage 102 is designed to provide an appropriate axial width for desired communication with either the hydraulic pressure inlet ports 82 or the hydraulic pressure outlet ports 84 such that the hydraulic drive may be activated.

The second valve element 86 is positionally responsive to and controlled by a feedback means for sensing the effective diameter of the sheave 10. Such means may include electronic sensing apparatus or the like. However, in the preferred embodiment illustrated in the figures, this feedback means 104 is provided by a rigid link 106 which extends to one side of the sheave 10. The rigid link 106 is slidably mounted within the fixed piston 52. A cylindrical space 108 is provided about a portion of the rigid link 106 to accept a bias spring 110. The bias spring 110 extends within the space 108 to a seal and mounting ring 112. Thus, the rigid link 106 is biased against the side of the sheave 10.

The rigid link 106 is coupled with the second valve element 86 of the control valve 54 by means of a 45° ramp 114 cooperating with a roller element 116. As the rigid element 106 moves with the sheave 10 in the direction of reduced effective sheave diameter, the second valve element 86 is forced toward the source of hydraulic pressure by means of the ramp 114 cooperating with the roller 116. Naturally, as the sheave moves toward an effectively larger diameter, the second valve element 86 moves toward the pressure outlet.

To provide communication between the hydraulic chamber 48 and the passage 90, a passage 118 extends through the rigid link 106. Thus, communication is established through the outlet 92 and the passage 118.

Looking then to the operation of the variable ratio drive, at start-up and low speeds the centrifugal weight 70 is biased by the spring 72 toward the axis of the device. Thus, the first valve element 76 is positioned adjacent the annular flange 64. The second valve element 86 will then adjust such that the effective sheave diameter is at a maximum. This condition is illustrated in FIG. 1. Thus, during low speed conditions, the sheave 10 drives the auxiliary drive belt 18 at a high ratio compared to engine speed.

As engine speed increases, the rotational motion of the driving member 12 influences the centrifugal weight 70 so as to act against the spring 72 and move outwardly toward the plug 68. As this occurs, the annular passage 102 and control port 100 of the second valve element 86 will come into communication with the hydraulic pressure outlet port 84. Thus, hydraulic pressure and fluid will be relieved from the hydraulic chamber 48 of the hydraulic drive. This will result in the sheave 10 reducing its effective diameter. A sensing of the reduction in effective diameter is realized by the rigid link 106 which measures the effective diameter by the location of the sidewall of the sheave. The rigid link 106 will move toward the second valve element 86 and force the second valve element 86 further toward the first valve element 76. As a result, the hydraulic pressure outlet port 84 will again be closed by the closure member of the second valve element 86. At this point the sheave 10 is again fixed at a constant effective diameter.

If the speed of the engine is reduced or if the sheave overshoots its reduction in effective diameter from the foregoing described operation, the annular passage 102 and control port 100 will come into communication with the hydraulic pressure inlet port 82. At this time, pressure will be supplied to the hydraulic chamber 48 to increase the effective diameter of the sheave.

Thus, a stepless variable ratio drive is disclosed which provides a speed dependent input and a position dependent feedback control. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A variable ratio drive comprising
   a variable diameter sheave;
   a hydraulic drive coupled to said sheave to vary the diameter thereof;
   input means mounted to rotate with said sheave for sensing sheave speed;
   feedback means mounted to rotate with said sheave for sensing sheave diameter; and
   a hydraulic control valve in communication with said hydraulic drive, said hydraulic control valve having a first valve element positionally responsive to said input means and a second valve element positionally response to said feedback means.

2. The variable ratio drive of claim 1 wherein one of said valve elements includes a hydraulic pressure inlet port and the other of said valve elements includes a valve port closure member.

3. The variable ratio drive of claim 1 wherein one of said valve elements includes a hydraulic pressure inlet port and a hydraulic pressure outlet port and the other of said valve elements includes a valve port closure member.

4. The variable ratio drive of claim 1 wherein said input means includes a spring biased centrifugal weight.

5. The variable ratio drive of claim 1 wherein said feedback means for sensing sheave diameter includes a rigid link extending to one side of said sheave.

6. The variable ratio drive of claim 1 wherein said variable diameter sheave includes a driving shaft and first and second side plates, and wherein said hydraulic drive includes a hydraulic chamber having a first wall thereof being one of said first and second side plates of said variable diameter sheave, said first wall of said hydraulic chamber being axially movable relative to said driving shaft.

7. The variable ratio drive of claim 6 wherein said first side plate includes a first hub having right-hand internal threads, said second side plate includes a hub having left-hand internal threads, said variable diameter sheave further including a sleeve rotatably positioned on said driving shaft, said hub being positioned on said sleeve, said sleeve having external threads mating with said internal threads of said first and second side plates.

8. A variable ratio drive comprising
   a variable diameter sheave;
   a hydraulic drive coupled to said sheave to vary the diameter thereof;
   a spring biased centrifugal weight mounted to rotate with said sheave;
   a rigid link extending to one side of said sheave; and
   a hydraulic control valve in communication with said hydraulic drive, said hydraulic control valve having a first valve element coupled to move with said spring bias centrifugal weight and a second valve element coupled to move with said rigid link.

9. The variable ratio drive of claim 8 wherein one of said valve elements includes a hydraulic pressure inlet port and the other of said valve elements includes a valve port closure member.

10. The variable ratio drive of claim 8 wherein one of said valve elements includes a hydraulic pressure inlet port and a hydraulic pressure outlet port and the other of said valve elements includes a valve port closure member.

11. A variable ratio drive comprising
a variable diameter sheave;
a hydraulic drive coupled to said sheave to vary the diameter thereof;
input means mounted to rotate with said sheave for sensing sheave speed;
feedback means of said second valve element for sensing sheave diameter; and
a hydraulic control valve in communication with said hydraulic drive and including a first valve element having a hydraulic pressure inlet port and being positionally responsive to one of said input and said feedback means and a second valve element having a passage in communication with said hydraulic drive and a valve port closure member of said second valve element selectively positionable between said passage and said inlet port and being positionally responsive to the other of said input and said feedback means.

12. The variable ratio drive of claim 11 wherein said first valve element of said hydraulic control valve further has a hydraulic pressure outlet port, said closure member of said second valve element being selectively positionable between said passage and said outlet port.

13. The variable ratio drive of claim 12 wherein said input means includes a spring biased centrifugal weight.

14. The variable ratio drive of claim 12 wherein said feedback means for sensing sheave diameter includes a rigid link extending to one side of said sheave.

15. The variable ratio drive of claim 12 wherein said first valve element includes a first cylindrical tube, said hydraulic pressure inlet port extending through the wall of said first cylindrical tube, said second valve element including a second cylindrical tube concentrically and slidably mounted in said first cylindrical tube, the wall of said second cylindrical tube defining said closure member, said passage extending axially through said second cylindrical tube, said second cylindrical tube including a control port through the closure member thereof to permit selective communication between said inlet port and said passage.

16. A variable ratio drive comprising
a variable diameter sheave;
a hydraulic drive coupled to said sheave to vary the diameter thereof;
a spring biased centrifugal weight mounted to rotate with said sheave;
a rigid link extending to one side of said sheave; and
a hydraulic control valve in communication with said hydraulic drive and including a first valve element having a hydraulic pressure inlet port and a hydraulic pressure oulet port, said first valve element being positionally responsive to one of said spring biased centrifugal weight and said rigid link and a second valve element having a passage in communication with said hydraulic drive and a valve port closure member of said second valve element selectively positionable between said passage and said inlet port and selectively positionable between said passage and said outlet port and being positionally responsive to the other of said spring biased centrifugal weight and said rigid link, said first valve element including a first cylindrical tube with said hydraulic pressure inlet port extending through the wall of said first cylindrical tube, and said second valve element including a second cylindrical tube concentrically and slidably mounted in said first cylindrical tube, the wall of said second cylindrical tube defining said closure member, said passage extending axially through said second cylindrical tube, said cylindrical tube including a control port through the closure member thereof to permit selective communication between said inlet port and said passage.

* * * * *